(12) United States Patent
Blackstock et al.

(10) Patent No.: US 12,147,644 B2
(45) Date of Patent: Nov. 19, 2024

(54) GENERATING ANIMATION OVERLAYS IN A COMMUNICATION SESSION

(71) Applicant: Snap Inc., Santa Monica, CA (US)

(72) Inventors: Jacob Edward Blackstock, Toronto (CA); Timothy Jordan Garcia, Toronto (CA); Matthew Colin Grantham, Toronto (CA); Shahan Panth, Toronto (CA); David Whyte, Toronto (CA)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/520,476

(22) Filed: Nov. 5, 2021

(65) Prior Publication Data

US 2022/0129140 A1    Apr. 28, 2022

Related U.S. Application Data

(63) Continuation of application No. 16/457,395, filed on Jun. 28, 2019, now Pat. No. 11,188,190.

(51) Int. Cl.
  *G06F 3/04817* (2022.01)
  *G06F 3/0482* (2013.01)
  (Continued)

(52) U.S. Cl.
  CPC ........ *G06F 3/04817* (2013.01); *G06F 3/0482* (2013.01); *G06F 3/1454* (2013.01); *H04L 51/52* (2022.05)

(58) Field of Classification Search
  None
  See application file for complete search history.

(56) References Cited

U.S. PATENT DOCUMENTS

| 5,880,731 A | 3/1999 | Liles et al. |
| 6,023,270 A | 2/2000 | Brush et al. |

(Continued)

FOREIGN PATENT DOCUMENTS

| CN | 105938409 | 9/2016 |
| CN | 107431632 | 12/2017 |

(Continued)

OTHER PUBLICATIONS

"U.S. Appl. No. 16/457,395, Non Final Office Action mailed Feb. 20, 2020", 17 pgs.

(Continued)

*Primary Examiner* — Henry Orr
(74) *Attorney, Agent, or Firm* — Schwegman Lundberg & Woessner, P.A.

(57) ABSTRACT

Method of generating animation overlays starts with a processor causing a communication interface for a communication session to be displayed at client devices. The processor receives from a first client device an animation sending request and causes an animation sending interface to be displayed in the communication interface of the first client device. The animation sending interface comprises animation overlay icons. Each of the animation overlay icons comprise a first avatar associated with the first user. The processor receives from the first client device a selection of a first animation overlay icon and causes the first animation overlay corresponding to the first animation overlay icon to be displayed as an overlay on the communication interface of each of the plurality of client devices. The first animation overlay is an animation that includes the first avatar. Other embodiments are disclosed.

20 Claims, 9 Drawing Sheets

(51) Int. Cl.
   *G06F 3/14*   (2006.01)
   *H04L 51/52*  (2022.01)

(56) References Cited

U.S. PATENT DOCUMENTS

| | | |
|---|---|---|
| 6,223,165 B1 | 4/2001 | Lauffer |
| 6,229,533 B1 | 5/2001 | Farmer et al. |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,908,554 B1 | 3/2011 | Blattner |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,483,859 B2 | 11/2016 | Blattner et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 11,188,190 B2 | 11/2021 | Blackstock et al. |
| 2001/0019330 A1 | 9/2001 | Bickmore et al. |
| 2002/0067362 A1 | 6/2002 | Agostino Nocera et al. |
| 2002/0169644 A1 | 11/2002 | Greene |
| 2005/0143108 A1 | 6/2005 | Seo et al. |
| 2005/0162419 A1 | 7/2005 | Kim et al. |
| 2005/0206610 A1 | 9/2005 | Cordelli |
| 2006/0041629 A1* | 2/2006 | Lira .............. H04L 12/1827 709/206 |
| 2006/0294465 A1 | 12/2006 | Ronen et al. |
| 2007/0113181 A1 | 5/2007 | Blattner et al. |
| 2007/0168863 A1* | 7/2007 | Blattner ............ G06F 3/011 715/706 |
| 2007/0176921 A1 | 8/2007 | Iwasaki et al. |
| 2008/0082613 A1* | 4/2008 | Szeto ............ G06Q 10/107 709/206 |
| 2008/0158222 A1 | 7/2008 | Li et al. |
| 2008/0215995 A1* | 9/2008 | Wolf ................. G06T 11/00 715/753 |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2009/0328122 A1 | 12/2009 | Amento et al. |
| 2010/0011422 A1 | 1/2010 | Mason et al. |
| 2010/0023885 A1 | 1/2010 | Reville et al. |
| 2010/0045697 A1 | 2/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0113351 A1* | 5/2011 | Phillips .......... H04N 21/4788 715/753 |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0110477 A1 | 5/2012 | Gaume |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |

(56) References Cited

U.S. PATENT DOCUMENTS

| | | |
|---|---|---|
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0160149 A1 | 6/2014 | Blackstock et al. |
| 2014/0372541 A1 | 12/2014 | Feghali |
| 2015/0206349 A1 | 7/2015 | Rosenthal et al. |
| 2015/0220774 A1 | 8/2015 | Ebersman et al. |
| 2016/0134840 A1 | 5/2016 | Mcculloch |
| 2016/0234149 A1 | 8/2016 | Tsuda et al. |
| 2016/0259526 A1* | 9/2016 | Lee .................. H04L 51/04 |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2017/0336926 A1 | 11/2017 | Chaudhri et al. |
| 2017/0358117 A1 | 12/2017 | Goossens et al. |
| 2018/0025219 A1 | 1/2018 | Baldwin et al. |
| 2018/0047200 A1 | 2/2018 | O'hara et al. |
| 2018/0113587 A1* | 4/2018 | Allen ................ H04L 51/063 |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0171338 A1* | 6/2019 | Voss .................. G06T 13/40 |
| 2019/0188920 A1 | 6/2019 | Mcphee et al. |
| 2019/0295056 A1 | 9/2019 | Wright |
| 2020/0409533 A1 | 12/2020 | Blackstock et al. |

FOREIGN PATENT DOCUMENTS

| | | |
|---|---|---|
| CN | 109863532 | 6/2019 |
| CN | 110168478 | 8/2019 |
| CN | 114008597 A | 2/2022 |
| CN | 115952016 A | 4/2023 |
| EP | 2184092 | 5/2010 |
| JP | 2001230801 | 8/2001 |
| JP | 5497931 | 3/2014 |
| KR | 101445263 | 9/2014 |
| KR | 102506346 B1 | 3/2023 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | WO-2016179235 A8 | 11/2016 |
| WO | 2018081013 | 5/2018 |
| WO | 2018102562 | 6/2018 |
| WO | 2018129531 | 7/2018 |
| WO | 2019089613 | 5/2019 |
| WO | 2020264549 | 12/2020 |

OTHER PUBLICATIONS

"U.S. Appl. No. 16/457,395, Response filed May 20, 2020 to Non Final Office Action mailed Feb. 20, 2020", 10 pgs.

"U.S. Appl. No. 16/457,395, Final Office Action mailed Aug. 26, 2020", 22 pgs.

"International Application Serial No. PCT/US2020/070155, International Search Report mailed Oct. 9, 2020", 5 pgs.

"International Application Serial No. PCT/US2020/070155, Written Opinion mailed Oct. 9, 2020", 7 pgs.

"U.S. Appl. No. 16/457,395, Response filed Nov. 25, 2020 to Final Office Action mailed Aug. 26, 2020", 11 pgs.

"U.S. Appl. No. 16/457,395, Non Final Office Action mailed Mar. 8, 2021", 25 pgs.

"U.S. Appl. No. 16/457,395, Response filed Jun. 8, 2021 to Non Final Office Action mailed Mar. 8, 2021", 11 pgs.

"U.S. Appl. No. 16/457,395, Notice of Allowance mailed Jul. 30, 2021", 19 pgs.

"International Application Serial No. PCT/US2020/070155, International Preliminary Report on Patentability mailed Jan. 6, 2022", 9 pgs.

"Korean Application Serial No. 10-2022-7002740, Notice of Preliminary Rejection mailed May 24, 2022", w/ English Translation, 4 pgs.

"Korean Application Serial No. 10-2023-7007204, Notice of Preliminary Rejection mailed Jun. 8, 2023", w/ English Translation, 4 pgs.

"Chinese Application Serial No. 202310109246.1, Office Action mailed Aug. 31, 2023", w/ English Translation, 23 pgs.

"Chinese Application Serial No. 202310109246.1, Response Filed Jan. 11, 2024 to Office Action mailed Aug. 31, 2023", w/ English Claims, 16 pgs.

"Chinese Application Serial No. 202310109246.1, Office Action mailed Mar. 7, 2024", w/English translation, 24 pgs.

"Chinese Application Serial No. 202310109246.1, Response filed May 6, 2024 to Office Action mailed Mar. 7, 2024", with English claims, 4 pgs.

* cited by examiner

GENERATING ANIMATION OVERLAYS IN A COMMUNICATION SESSION

CROSS-REFERENCE TO RELATED APPLICATION

This application is a continuation of U.S. patent application Ser. No. 16/457,395, filed Jun. 28, 2019, which is incorporated by reference herein in its entirety.

BACKGROUND

The popularity of electronic messaging, particularly instant messaging, continues to grow. Users increasingly use customized avatars within electronic messages such as texts and emails reflecting a global demand to communicate more visually.

These customized avatars can be personalized by the users to represent the users in various applications, video games, messaging services, etc. Since the customized avatars can be generated in a different array of situations, displaying various emotions, or even be animated, the users are able to communicate their feelings more accurately in messages using the customized avatars.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
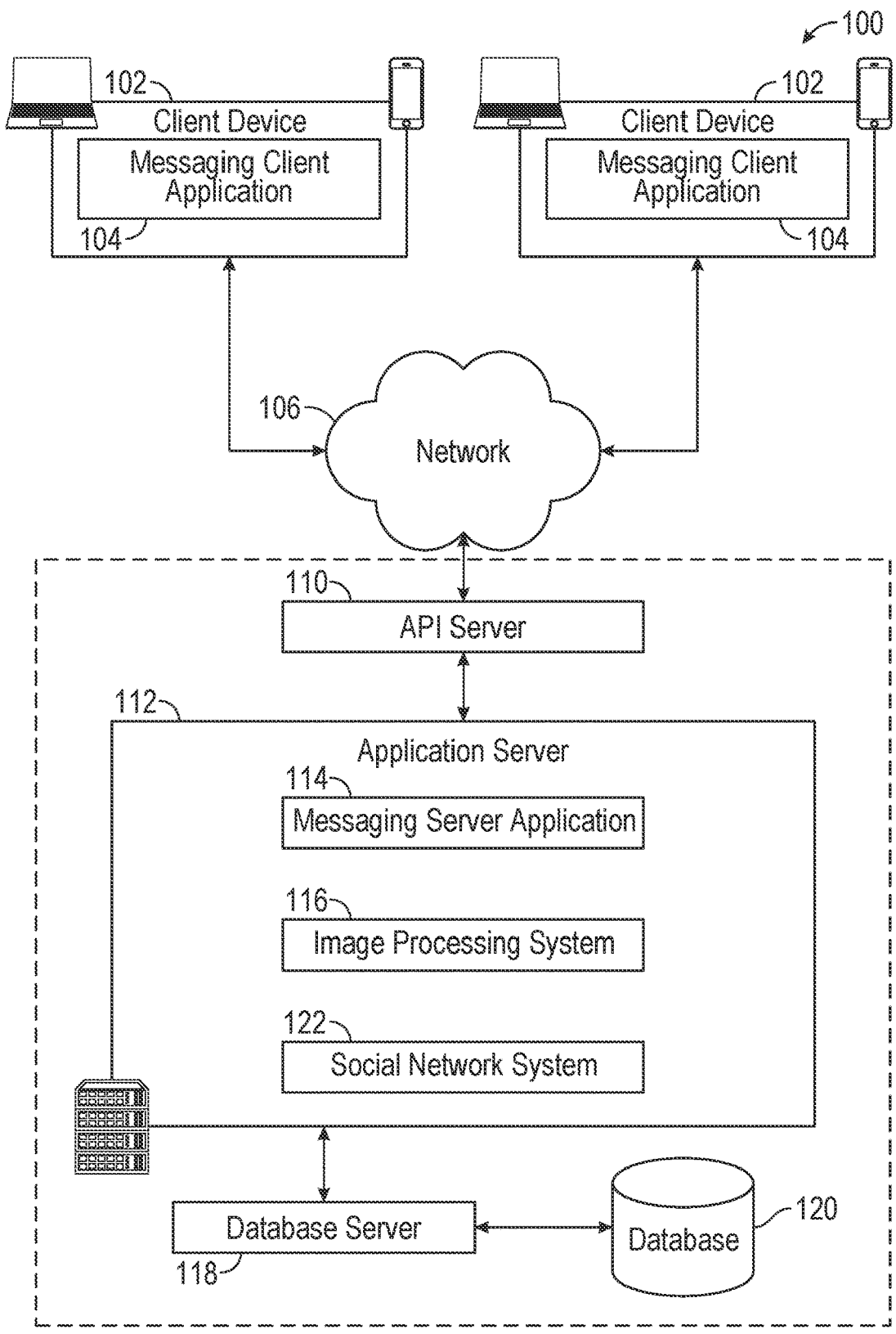
FIG. 1 is a block diagram showing an example messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of electronic messaging software and systems by generating animation in a communication session. In one embodiment, the electronic messaging system hosts a communication session between two or more users. Each of the users can be represented by an avatar which appears a chat presence bar of the communication interface when the users are present in the communication session. A first user in the communication session can cause an animation overlay to be sent to the users in the communication session. The animation overlay is then caused to be displayed on the communication interfaces of the client devices of the users in the communication session. The animation overlay is an ephemeral animation that includes the avatar associated with the first user. The animation overlay can also include an avatar associated with another user in the communication session. In one embodiment, the animation overlay can include a three-dimensional animation.

While a group of users can be members of a group communication (e.g., group chat), a communication session includes the members that are present or active in the group communication. The members that are actively participating can be a subset of the members of the group communication or all of the members in the group communication. The members that are actively participating can be members that have the communication interface displayed on the members' client device. In some embodiments, the animation overlay appears on the client devices of the users that are present in the communication session. In other embodiments, the animation overlay can appear on the client devices of the all the users in the group communication even if the user is not present in the group communication (e.g., group chat) at the time the animation overlay was generated. In this embodiment, the animation overlay can appear on the client devices of the absent users at the time the users are rejoin (or are present) in the group communication (e.g., when the user opens the group chat on his client device).

In addition to the first animation overlay being displayed on the client devices, the system may also cause the client devices to vibrate or generate a sound. The vibration or sound generated by the client devices may also occur concurrently with the animation of the first user's avatar on the client devices.

Using the animation overlays, the messaging system provides the users new way to communicate using the system. Specifically, this animation overlay is displayed as an additional layer to the communication interface and thus, provides a new dimension within the messaging system that is private, in real-time, and not traceable. Since this functionality is available to users that are present in the communication session, the system is further improved in that it may increase the engagement of users with the system as well as increase the length of time the users maintain presence.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces to a communications network (such as network 106) to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In the example shown in FIG. 1, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content including images and video clips) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Some embodiments may include one or more wearable devices, such as a pendant with an integrated camera that is integrated with, in communication with, or coupled to, a client device 102. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, and/or any other wearable devices.

Figure 2:
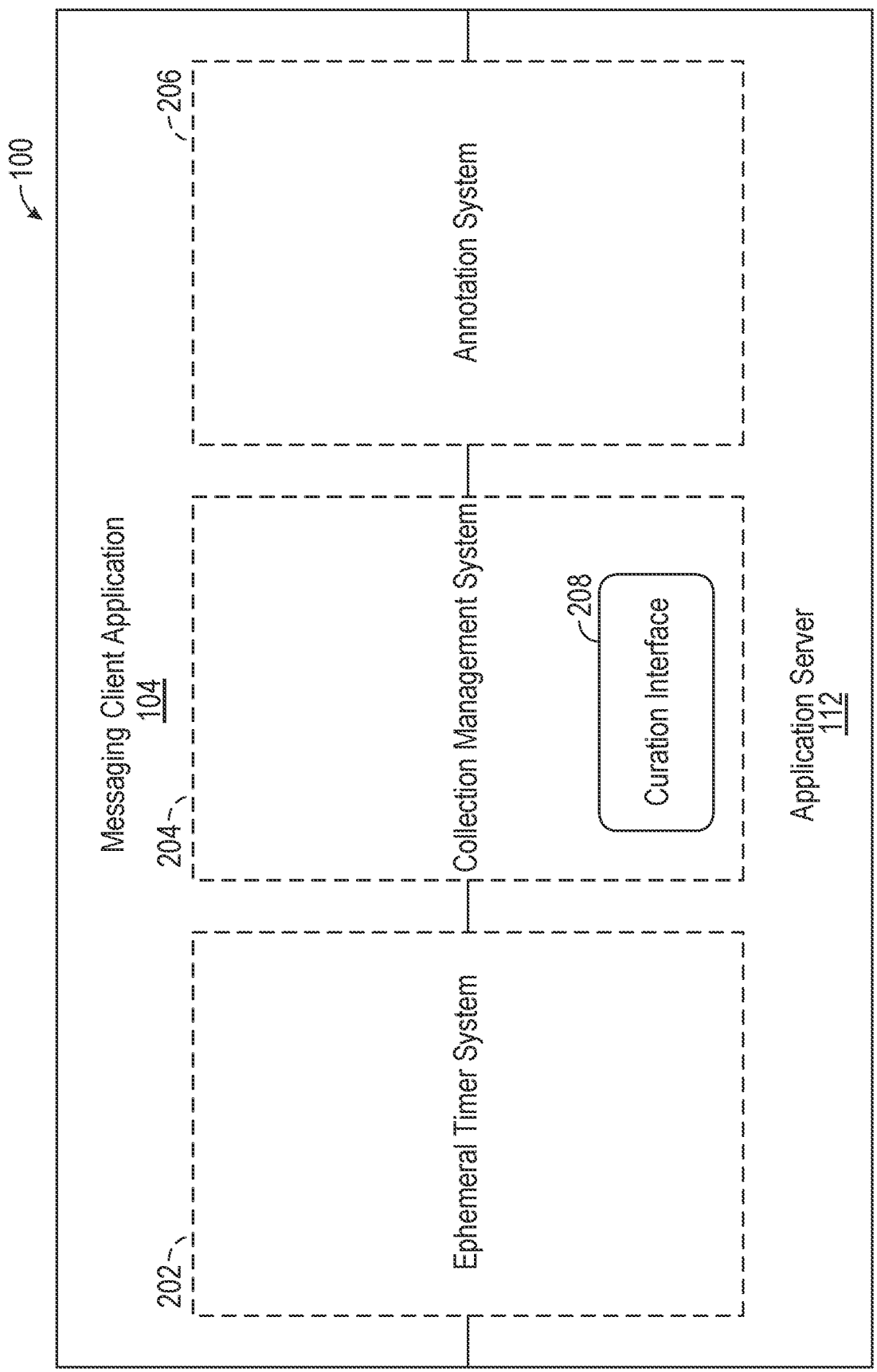
FIG. 2 is block diagram illustrating further details regarding a messaging system, according to exemplary embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
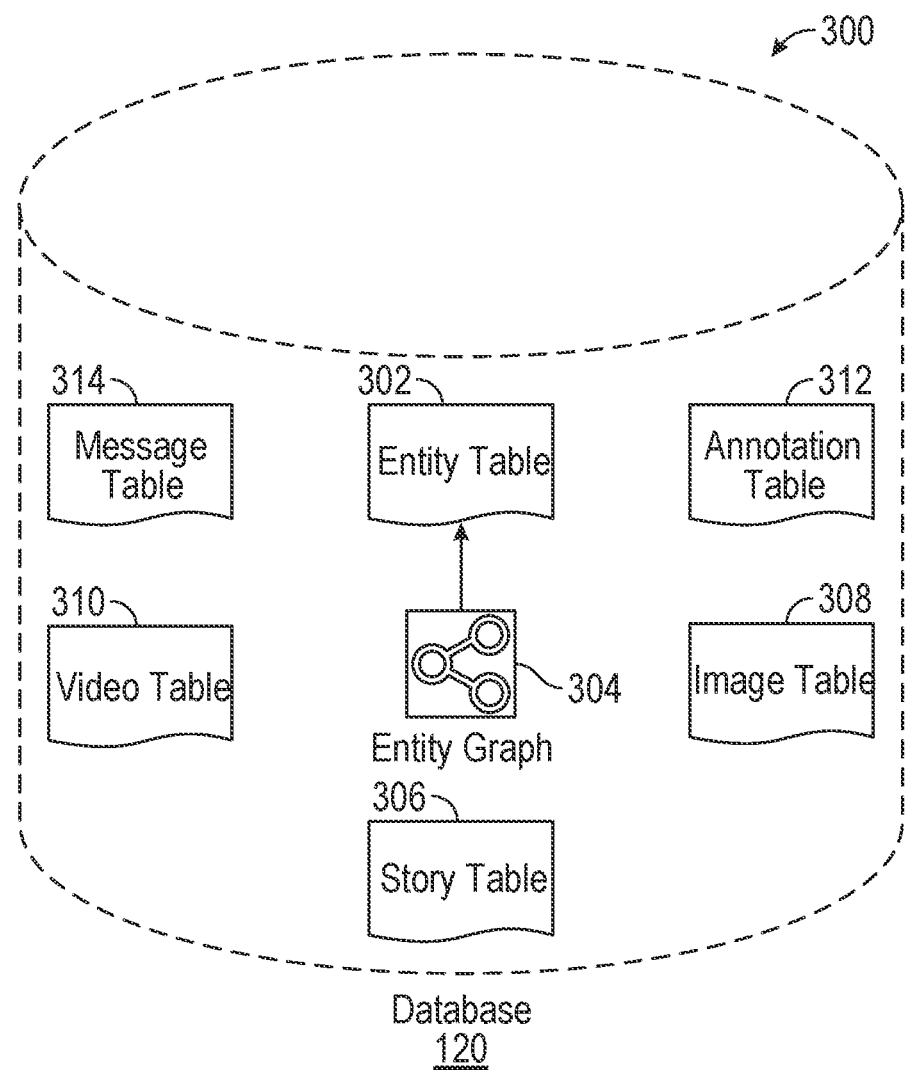
FIG. 3 is a schematic diagram illustrating data which may be stored in the database of the messaging server system, according to various exemplary embodiments.

In another exemplary embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Embodiments of the present disclosure may generate and present customized images for use within electronic messages such as SMS or MMS texts and emails. The customized images may also be utilized in conjunction with the stories, filters, and ephemeral messaging functionality discussed herein.

Figure 4:
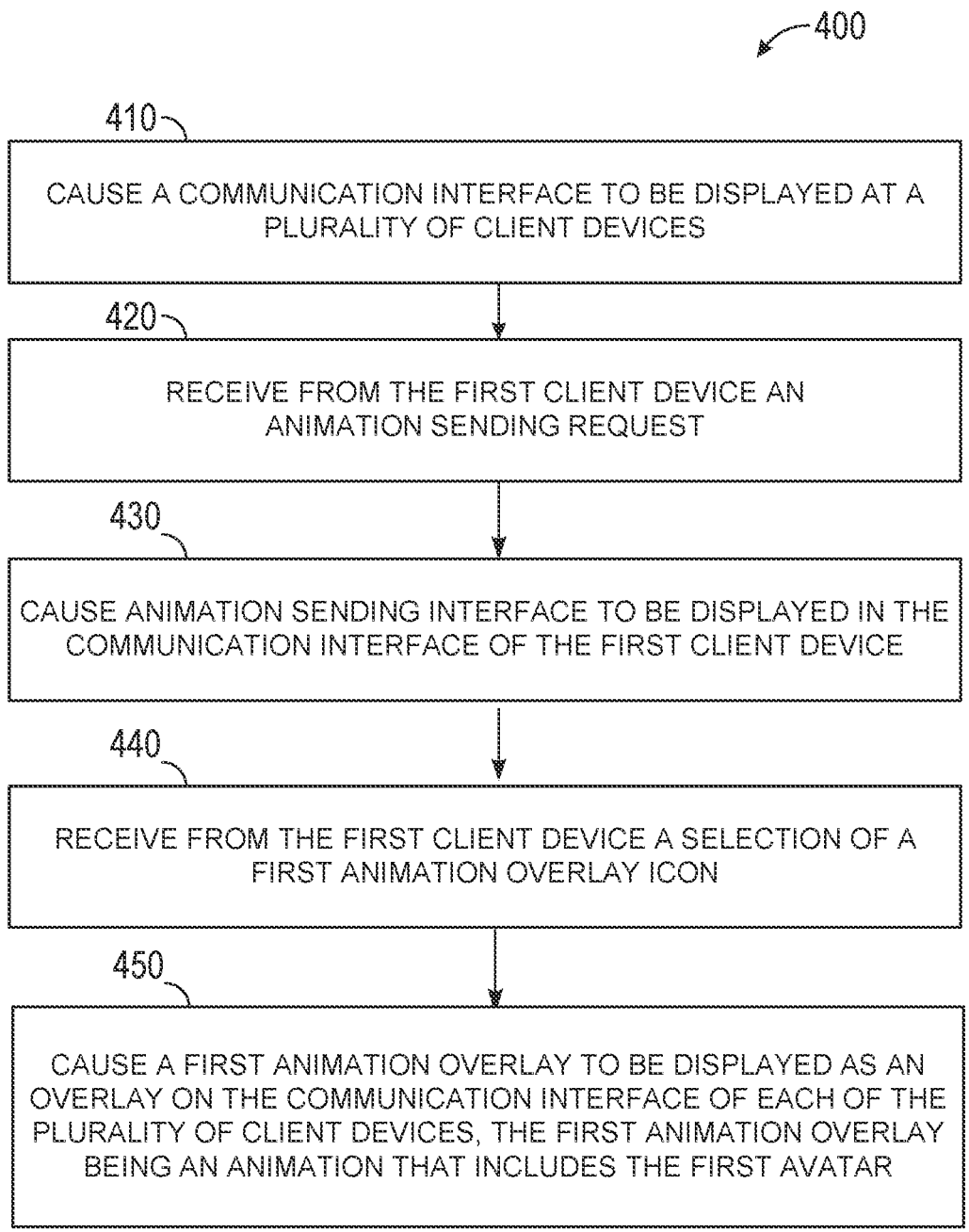
FIG. 4 is an exemplary flow diagram of a process according to various aspects of the disclosure.

FIG. 4 are exemplary flow diagrams of processes according to various aspects of the disclosure. Although the flowcharts may describe the operations as a sequential process, many of the operations can be performed in parallel or concurrently. In addition, the order of the operations may be re-arranged. A process is terminated when its operations are completed. A process may correspond to a method, a procedure, etc. The steps of methods may be performed in whole or in part, may be performed in conjunction with some or all of the steps in other methods, and may be performed by any number of different systems, such as the systems described in FIG. 1 and/or FIG. 7.

Figure 5A:
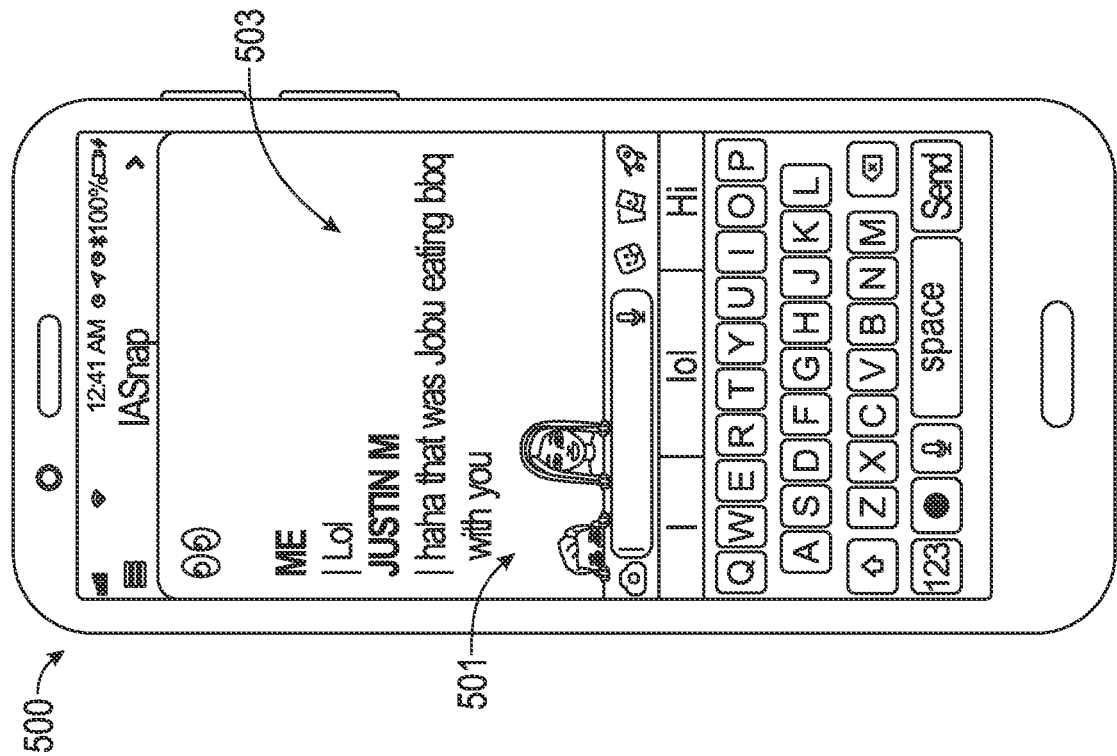
FIGS. 5A-5F are exemplary user interfaces according to various aspects of the disclosure.
Figure 5B:
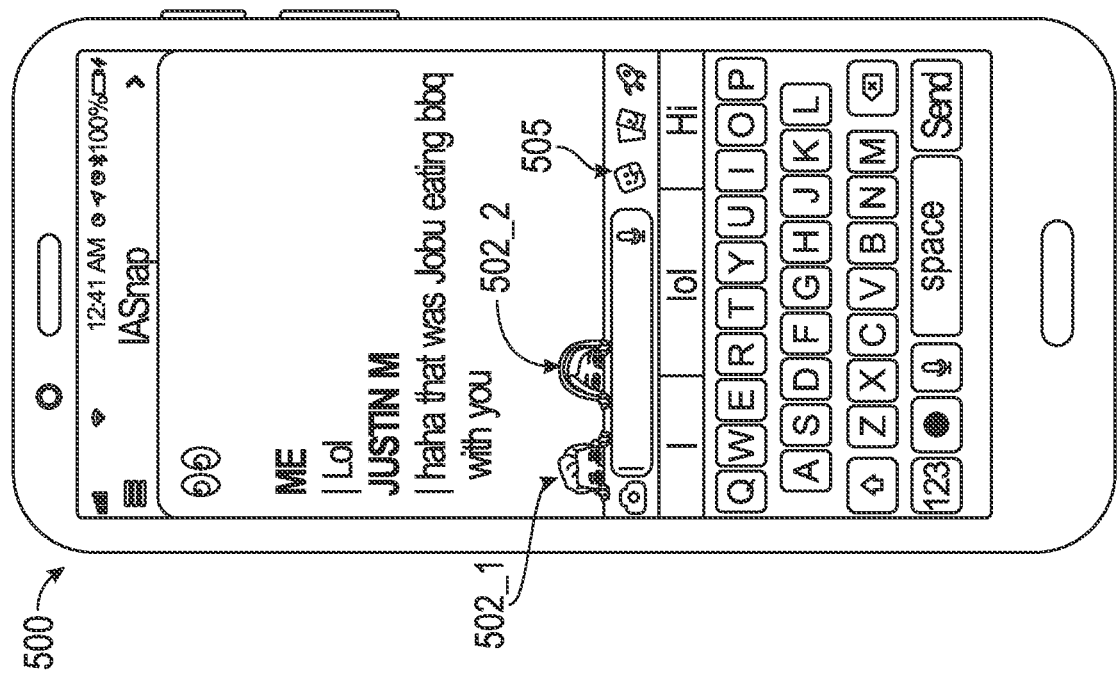

FIG. 4 depicts an exemplary process of generating private notifications between users in a communication session according to various aspects of the present disclosure. In this example, method 400 starts, at operation 410, with an application server of the messaging server system causing a communication interface for a communication session to be displayed at plurality of client devices. The communication session can be between two or more client devices. For example, FIGS. 5A-5B illustrate examples of the communication interface 500 being displayed at a first client device. As shown in FIGS. 5A-5B, the communication interface 500 includes a communication window 503 that displays the electronic communications (e.g., chat, text, images, animations) that were sent from users in the group chat (e.g., group communication).

While a group of users can be members of a group communication (e.g., group chat), a communication session includes the members that are actively participating in the group communication. The members that are actively participating can be a subset of the members of the group communication or all of the members in the group communication. For example, the members that are considered to be actively participating (or present) are the members have the communication interface displayed on the members' client device.

As shown in FIGS. 5A-5B, the communication interface 500 includes a chat presence bar 501 that includes presence indicators 502_1 to 502_n (n>1) associated with users of the client devices, respectively. In one embodiment, the presence indicators include the avatars of the users in the communication session. When a user is present (e.g., in an active state) in the communication session, an avatar associated with the user may be displayed in the chat presence bar 501 as a presence indicator for the user. In this example, the display of at least a portion of the user's avatar (e.g., a crouched avatar, a standing avatar, etc.) in the chat presence bar is the presence indicator is in an active state. Specifically, in a communication session that includes a first user of a first client device and a second user of a second client device, when the first user and the second user are present in the communication session, the first user's presence indicator (e.g., first avatar) and the second user's presence indicator (e.g., second avatar) are included in the chat presence bar of the communication interface displayed on the first client device and the second client device. For example, in FIGS. 5A-5B, the chat presence bar 501 in the communication interface 500** of the first client device includes two avatars 502_1, 502_2 which indicates that the two users associated with the two avatars 502_1, 502_2 are present or active in the communication session. In one embodiment, the first avatar 5021 is associated with the first user of the first client device.

In one embodiment, the application server can receive user identifiers associated with the users in the communication session and avatar characteristics associated with the user identifiers, respectively. In some embodiments, the user identifier may be received from an input within an electronic message from a client device 102 (e.g., the user's client device 102). For example, the user could input, via the user interface of the user's computing device, his or her name to generate the user's own customized avatar. Additionally or alternatively, the user identifier may be received based on information stored within the user's computing device. Any such identifier may be used, such as the user's full name or a username associated with the user. The user identifier may also be an identifier associated with the user's computing device, such as a Unique Device Identifier (UDID) or Identifier for Advertising (IDFA).

As used herein, an "avatar" of a user is any visual representation of user. The avatar of a user or individual may be any image resembling or otherwise associated with the user or individual. The avatar of a user may be based on characteristics derived from images of the user in conjunction with the avatar characteristics identified from the user's relationships with other users. Alternatively or additionally, the user may select and customize characteristics of the user's avatar via the user's computing device (i.e., customized avatar characteristics). Such customized avatar characteristics may include, for example, the user's bodily features (e.g., muscular, thin, etc.), facial features, clothing and accessories, text displayed in conjunction with the avatar, and images displayed in conjunction with the avatar. The avatar characteristics may be received or retrieved from a variety of sources, such as the local memory of a client device 102 as well as from other systems and devices, such as a database or server.

Referring back to FIG. 4, at operation 420, the application server receives an animation sending request from the first client device. In one embodiment, the animation sending request is received when the first client device detects a selection of the presence indicator associated with the user of the first client device. For example, the first user can select his own avatar (e.g., the first presence indicator 502_1) from the chat presence bar 501 in FIGS. 5A-5B. In one embodiment, the presence indicators 502_1-502_n are selectable user interface items. When the first user can select his own (first) avatar 502_1, the display of the first avatar 502_1 that appears crouched behind the chat presence bar 501 in FIG. 5A can change to appear to rise from behind the chat presence bar 501.

In another embodiment, the animation sending request is received when the first client device detects a selection of the presence indicator associated with the user of the second client device that is present in the communication session. For example, the first user can select the second presence indicator 502_2 (e.g., second avatar) from the chat presence bar 501 in FIGS. 5A-5B. When the first user can select the second presence indicator 502_2, the display of the second avatar 502_2 that appears crouched behind the chat presence bar 501 in FIG. 5A can change to appear to rise from behind the chat presence bar 501 as shown in FIG. 5B.

In another embodiment, the animation sending request is received when the first client device detects a selection of two or more presence indicators associated with users of the client devices that is present in the communication session. For example, within a predetermined period of time, the first user can select the two or more presence indicators 501_2-501_n in the chat presence bar 501.

In another embodiment, the animation sending request is received when the first client device detects a selection associated with a user that is a member of the group communication but that is not currently active in the communication session. In one embodiment, the chat presence bar includes a presence indicator in an inactive state which indicates that the user is not currently active or present (e.g., grayed out name tab, grayed out avatar, etc.).

In one embodiment, the animation sending request is received when the first client device detects a selection associated with an icon 505 that is included in the communication interface 500 in FIGS. 5A-5B. In one embodiment the icon 505 can be a selectable interface item that is associated with additional options of content items that can be sent (e.g., animation overlays, stickers, Graphics Interchange Format (gifs), songs, etc.).

Figure 5C:
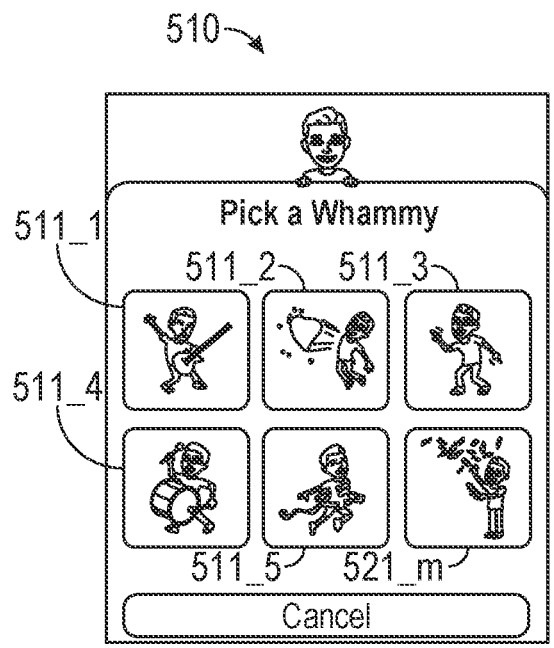

At operation 430, the application server causes an animation sending interface to be displayed in the communication interface of the first client device. For example, when the first user selects the first presence indicator 502_1 (e.g., second avatar) from the communication interface 500 in FIGS. 5A-5B, the animation sending interface 510 in FIG. 5C is caused to be displayed in the communication interface 500 of the first client device. The animation sending interface 510 appear over the communication interface 500 in FIGS. 5A-5B. In some examples, the animation sending interface 510 is a card that slides upwards from the bottom of the communication interface 500 in FIGS. 5A-5B. As shown in FIG. 5C, the animation sending interface 510 includes animation overlay icons 511_1 to 511_m (m>1). Each of the animation overlay icons 511_1 to 511_m includes the first avatar that is associated with the first user. The animation overlay icons 511_1 to 511_m are selectable user interface items that correspond to animation overlays featuring the first avatar.

Figure 5D:
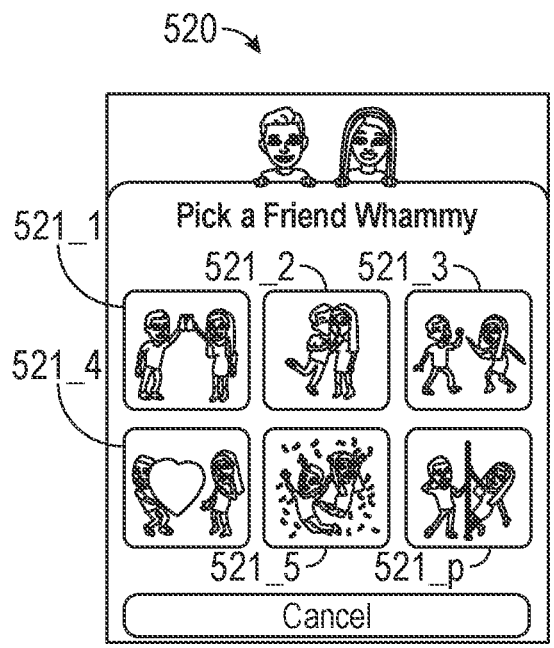

In another example, when the first user selects the second presence indicator 502_2 (e.g., second avatar) from the communication interface 500 in FIGS. 5A-5B, the animation sending interface 520 in FIG. 5D is caused to be displayed in the communication interface 500 of the first client device. The animation sending interface 520 appear over the communication interface 500 in FIGS. 5A-5B. In some examples, the animation sending interface 520 is a card that slides upwards from the bottom of the communication interface 500 in FIGS. 5A-5B. As shown in FIG. 5D, the animation sending interface 520 includes animation overlay icons 521_1 to 521_p (p>1). Each of the animation overlay icons 521_1 to 521_p includes the first avatar that is associated with the first user and the second avatar that is associated with the second user. The animation overlay icons 521_1 to 521_p are selectable user interface items that correspond to animation overlays featuring the first avatar and the second avatar.

In one embodiment, when the first client device detects a selection of two or more presence indicators associated with users of the client devices that is present in the communication session, the animation sending interface includes animation overlay icons that comprise the avatars of the users corresponding to the selection of two or more presence indicators. Similarly, when the first client device detects a selection associated with a user that is a member of the group communication but that is not currently active in the communication session. The animation sending interface includes animation overlay icons that comprise an avatar of the selected inactive user.

Figure 5E:
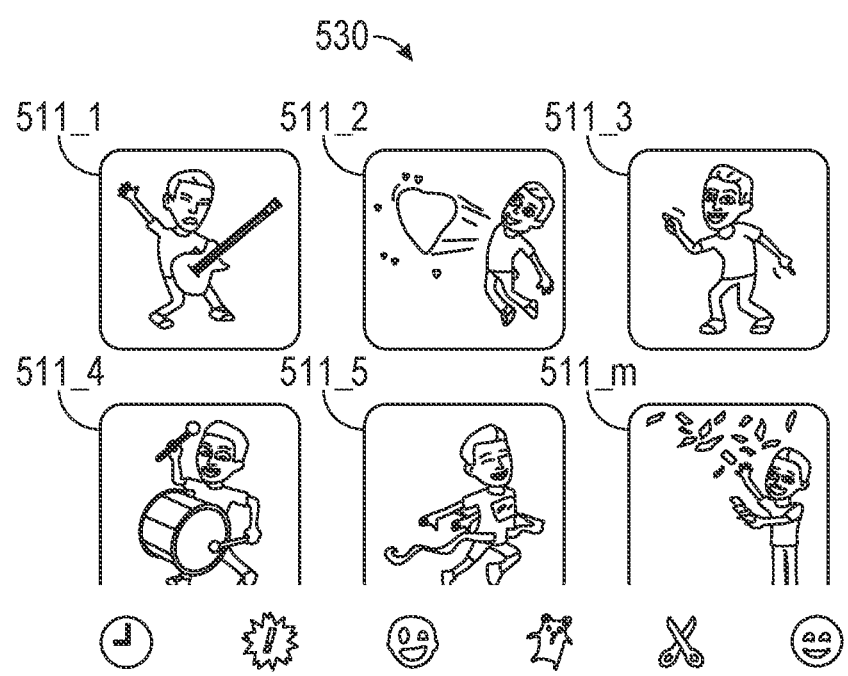

In one embodiment, when the first user selects the icon 505 from the communication interface 500 in FIGS. 5A-5B, the animation sending interface 530 in FIG. 5E is caused to be displayed in the communication interface 500 of the first client device. The animation sending interface 530 appear over the communication interface 500 in FIGS. 5A-5B. In some examples, the animation sending interface 530 is a card that slides upwards from the bottom of the communication interface 500 in FIGS. 5A-5B. As shown in FIG. 5E, the animation sending interface 530 includes animation overlay icons 511_1-511_m. Each of the animation overlay icons 511_1-511_m includes the first avatar that is associated with the first user. In one embodiment, the animation sending interface 530 can further include the animation overlay icons 521_1-521_p includes the first avatar that is associated with the first user and the second avatar that is associated with the second user.

At operation 440, the application server receives from the first client device a selection of a first animation overlay icon included in the plurality of animation overlays icons. For example, the first animation overlay icon 510_1 can be selected from the animation overlay icons 510_1-510_m in FIG. 5C which includes the first avatar.

At operation 450, the application server causes a first animation overlay corresponding to the first animation overlay icon to be displayed as an overlay on the communication interface of each of the plurality of client devices. In one embodiment, the application server transmits the first animation overlay to be displayed on the communication interface of each of the client devices. For example, the first animation overlay that corresponds to the first animation overlay icon 511_1 is an animation that includes the first avatar playing the guitar. When the first animation overlay is caused to be displayed on the client devices of the users in the communication session, the first animation overlay can appear as an overlay which is a layer above the communication window 503 (e.g., the portion of the communication interface 500 where the text or image messages are being displayed). In one embodiment, the animation overlay is caused to be displayed ephemerally for a predetermined period of time. For example, the first animation overlay can be displayed ephemerally for the duration of the animation. The first animation overlay can be an animation that includes the first avatar appearing to be animated and playing the guitar. In some embodiments, in addition to the first animation overlay being displayed, the application server can also cause the client devices in the communication session to vibrate or generate a sound. For example, in conjunction with the first animation overlay being displayed on the plurality of client devices, the client devices can be caused to vibrate or generate guitar sounds or a song. In one embodiment, the first animation overlay is a three-dimensional animation.

Figure 5F:
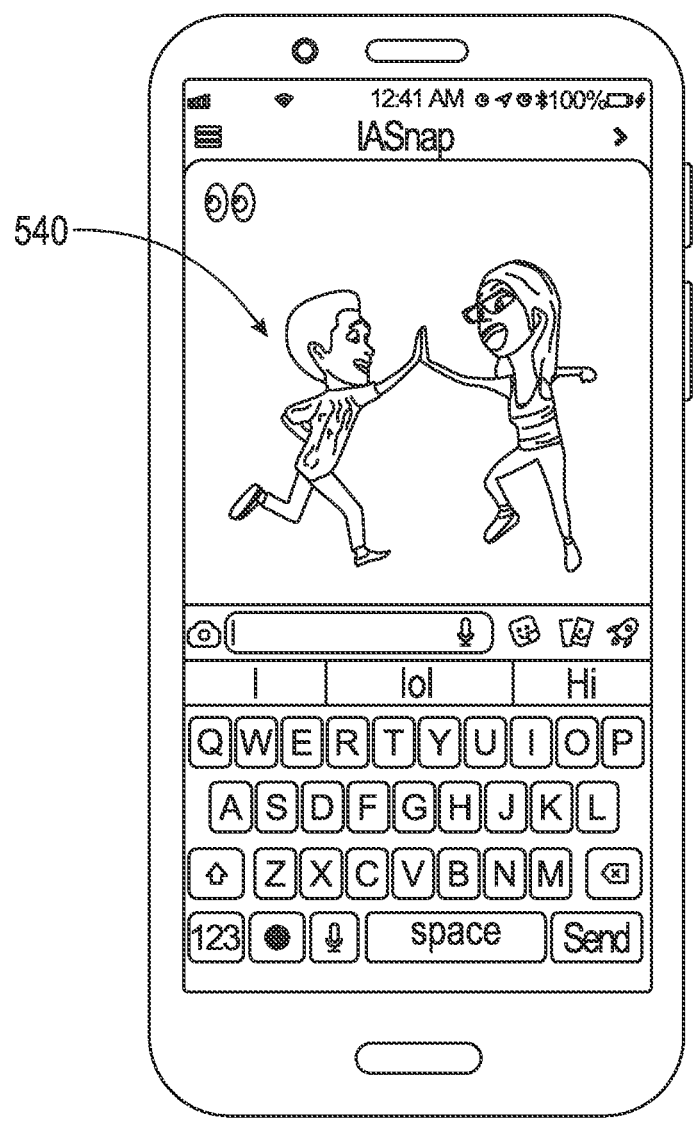

In another example, the first animation overlay that corresponds to the first animation overlay icon 521_1 is an animation that includes the first avatar and the second avatar giving each other a high five. Similarly, the first animation overlay can be an animation that includes the first avatar and the second avatar performing an animation wherein they are giving each other a high five. In FIG. 5F, an example of a first animation overlay 540 that is displayed as an overlay on the communication interface 500 of each of the client devices is shown. The first animation overlay 540 can include the first avatar and a second avatar performing an animation. Specifically, the first animation overlay 540 corresponds to the first animation overlay icon 520_1 such that, as shown in FIG. 5F, the first and second avatars are performing an animation in which they are giving each other a high-five.

In one embodiment, the first animation overlay 540 appears above the presence chat bar 510. The avatars in the first animation overlay 540 can appear to use the presence chat bar 510 as a floor to perform their animation thereon. Once the animation is complete, the first animation overlay 540 disappears to reveal the communication interface 500 with the communication window 503. In one embodiment, once completed, the first animation overlay 540 leaves no trace and cannot be replayed. In another embodiment, the first animation overlay 540 may indicate in the communication window 503 that the first user sent the first overlay.

In some embodiments, the first animation overlay appears on the client devices of the users that are present in the communication session. In other embodiments, the animation overlay can appear on the client devices of the all the users in the group communication (e.g., group chat) even if the user is not active or present in the communication session at the time the animation overlay was generated. In this embodiment, the animation overlay can appear on the client devices of the absent users at the time the users become active in the group communication (e.g., when the user opens the group chat on his client device). The application server can cause the client devices of the users that are not present in the communication session to generate a notification indicating that the first user has sent an animation overlay to the group. The notification can appear as a push notification on the client devices.

In one embodiment, rather than sending the first animation overlay to the client devices of the users in the communication session or the group communication (e.g., group chat), the first user can select the one or more users in the group communication to receive the first animation overlay.

Figure 6:
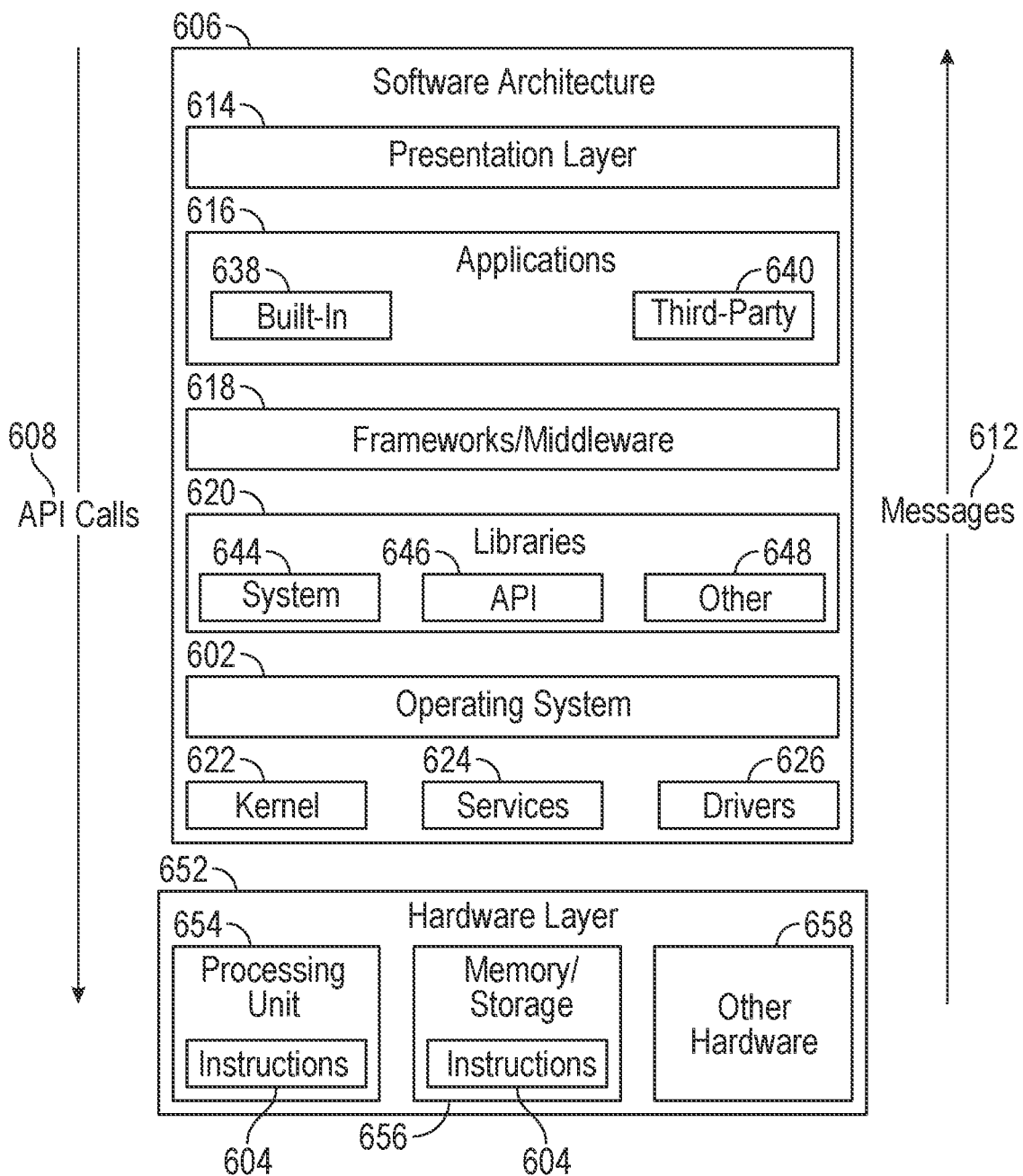
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory and/or storage modules memory/storage 656, which also have executable instructions 604. The hardware layer 652 may also comprise other hardware 658.

As used herein, the term "component" may refer to a device, physical entity or logic having boundaries defined by function or subroutine calls, branch points, application program interfaces (APIs), and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 and/or other components within the layers may invoke application programming interface (API) API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 and/or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 7:
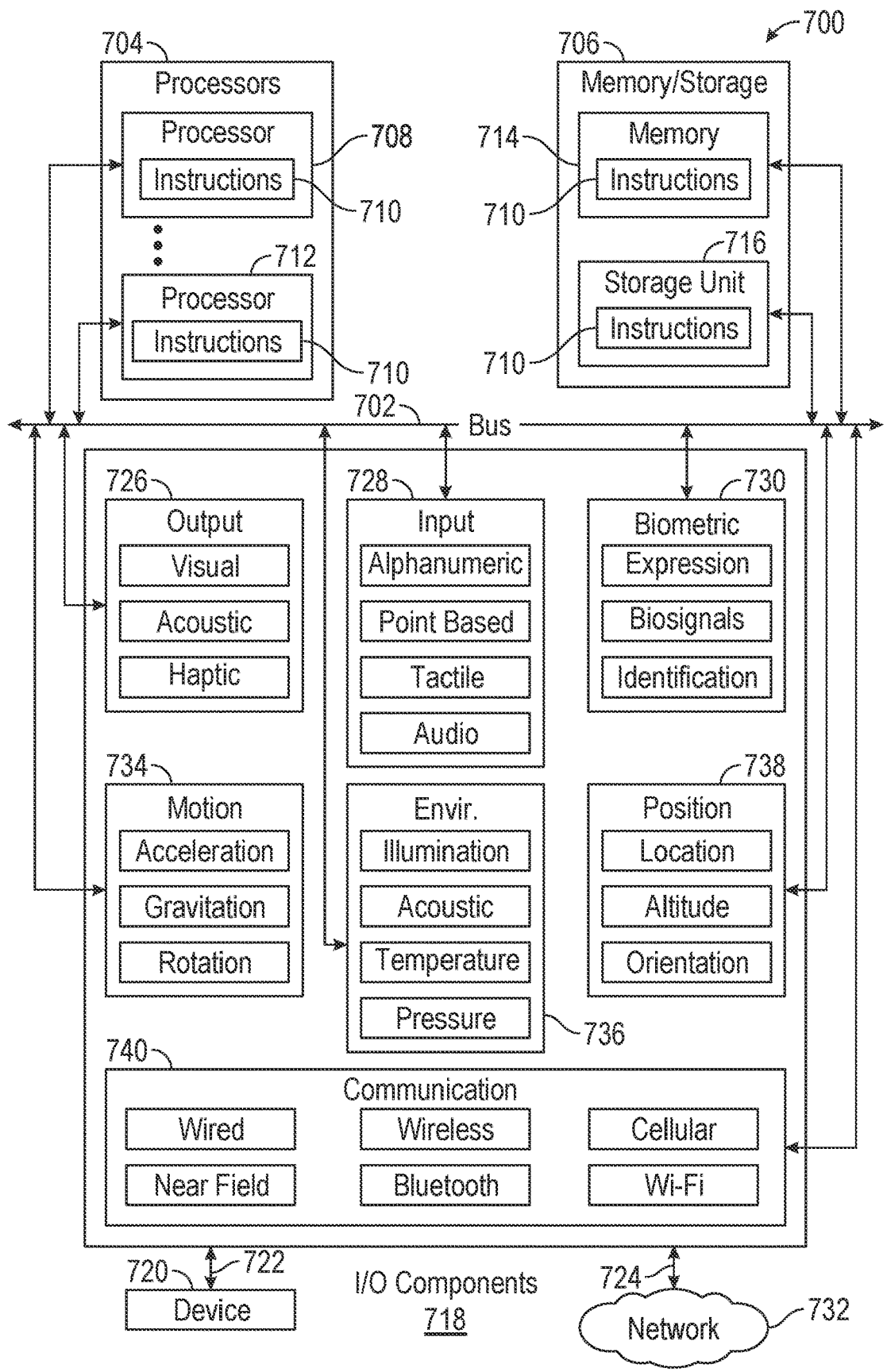
FIG. 7 is a block diagram illustrating components of a machine, according to some exemplary embodiments, able to read instructions from a machine-readable medium (e.g., a machine-readable storage medium) and perform any one or more of the methodologies discussed herein.

FIG. 7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific U/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like. The input components 728 may also include one or more image-capturing devices, such as a digital camera for generating digital images and/or video.

In further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combinations thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 700, such as the system's 700 GPS coordinates and/or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A system comprising:
a processor; and
a memory component having instructions stored thereon, when executed by the processor, causes the system to perform operations comprising:
causing a communication interface for a communication session of a communication group to be displayed at a plurality of client devices including a first client device that is associated with a first user, the communication interface including a chat presence bar, the chat presence bar including a presence indicator indicating a second user in the communication group is in an inactive state, the second user being associated with a second client device, the first user being associated with a first avatar;
detecting a selection by the first client device of the presence indicator indicating the second user in the communication group is in the inactive state;
responsive to detecting the selection of the presence indicator indicating the second user in the communication group is in the inactive state, causing an animation sending interface to be displayed in the communication interface of the first client device, the animation sending interface comprising a plurality of animation overlay icons, each of the animation overlay icons comprising the first avatar and a second avatar associated with the second user in the inactive state performing a plurality of actions;
receiving from the first client device a selection of a first animation overlay icon of the plurality of animation overlays icons, the first animation overlay icon comprising the first avatar and the second avatar performing a first action of the plurality of actions, the second user being in the inactive state; and
responsive to receiving an indication that the second user is in an active state from the second client device, causing the communication interface to be displayed on the second client device, causing a first animation overlay corresponding to the first animation overlay icon to be displayed as an overlay on the communication interface of the second client device, the first animation overlay being an animation that includes the first avatar and the second avatar performing the first action, the overlay being displayed as a layer above the communication interface.

2. The system of claim 1, wherein the chat presence bar displayed on the first client device comprises the presence indicator associated with the first user in an active state, wherein the presence indicator associated with the first user in the active state includes at least a portion of the first avatar.

3. The system of claim 1, wherein causing the first animation overlay to be displayed as the overlay on the communication interface of the second client device comprises:
causing the first animation overlay to be displayed for a predetermined period of time.

4. The system of claim 1, wherein the first animation overlay is a three-dimensional animation.

5. The system of claim 1, wherein causing the first animation overlay to be displayed as the overlay on the communication interface of the second client device comprises:
causing the first animation overlay to be displayed on each of the plurality of client devices associated with users that are present in the communication session.

6. The system of claim 1, wherein the presence indicator associated with the second user in the inactive state includes at least a greyed-out presence indicator.

7. The system of claim 6, wherein the greyed-out presence indicator associated with the second user in the inactive state comprises a name associated with the second user.

8. The system of claim 6,
wherein the greyed-out presence indicator associated with the second user in the inactive state comprises the avatar associated with the second user.

9. The system of claim 8, wherein the system causes the animation sending interface to be displayed in response to the first client device detecting activation of the presence indicator associated with the first user in the active state.

10. A method comprising:
causing, by a processor, a communication interface for a communication session of a communication group to be displayed at a plurality of client devices including a first client device that is associated with a first user, the communication interface including a chat presence bar, the chat presence bar including a presence indicator indicating a second user in the communication group is in an inactive state, the second user being associated with a second client device, the first user being associated with a first avatar;
detecting, by the processor, a selection by the first client device of the presence indicator indicating the second user in the communication group is in the inactive state;
responsive to detecting the selection of the presence indicator indicating the second user in the communication group is in the inactive state, causing, by the processor, an animation sending interface to be displayed in the communication interface of the first client device, the animation sending interface comprising a plurality of animation overlay icons, each of the animation overlay icons comprising the first avatar and a second avatar associated with the second user in the inactive state performing a plurality of actions;
receiving from the first client device a selection of a first animation overlay icon of the plurality of animation overlays icons, the first animation overlay icon comprising the first avatar and the second avatar performing a first action of the plurality of actions, the second user being in the inactive state; and responsive to receiving an indication that the second user is in an active state from the second client device, causing the communication interface to be displayed on the second client device, causing a first animation overlay corresponding to the first animation overlay icon to be displayed on the communication interface of the second client device, the first animation overlay being an animation that includes the first avatar and the second avatar performing the first action, the overlay being displayed as a layer above the communication interface.

11. The method of claim 10, wherein the chat presence bar displayed on the first client device comprises the presence indicator associated with the first user in an active state, wherein the presence indicator associated with the first user in the active state includes at least a portion of the first avatar.

12. The method of claim 10, wherein causing the first animation overlay to be displayed as the overlay on the communication interface of the second client device comprises:
causing the first animation overlay to be displayed for a predetermined period of time.

13. The method of claim 10, wherein the first animation overlay is a three-dimensional animation.

14. The method of claim 10, wherein causing the first animation overlay to be displayed as the overlay on the communication interface of the second client device comprises:
causing the first animation overlay to be displayed on each of the plurality of client devices associated with users that are present in the communication session.

15. The method of claim 10, wherein causing the first animation overlay to be displayed further comprises:
causing the plurality of client devices to vibrate or generate a sound.

16. The method of claim 10, wherein the presence indicator associated with the second user in the inactive state includes at least a greyed-out presence indicator.

17. The method of claim 16, wherein the greyed-out presence indicator associated with the second user in the inactive state comprises a name associated with the second user.

18. The method of claim 16,
wherein the greyed-out presence indicator associated with the second user in the inactive state comprises the avatar associated with the second user.

19. The method of claim 18, wherein the animation sending interface is caused to be displayed in response to the first client device detecting activation of the presence indicator associated with the first user in the active state.

20. A non-transitory computer-readable storage medium having stored thereon, instructions when executed by a processor, causes the processor to perform operations comprising:
causing, by a processor, a communication interface for a communication session of a communication group to be displayed at a plurality of client devices including a first client device that is associated with a first user, the communication interface including a chat presence bar, the chat presence bar including a presence indicator indicating a second user in the communication group is in an inactive state, the second user being associated with a second client device, the first user being associated with a first avatar;

detecting, by the processor, a selection by the first client device of the presence indicator indicating the second user in the communication group is in the inactive state;

responsive to detecting the selection of the presence indicator indicating the second user in the communication group is in the inactive state, causing, by the processor, an animation sending interface to be displayed in the communication interface of the first client device, the animation sending interface comprising a plurality of animation overlay icons, each of the animation overlay icons comprising the first avatar and a second avatar associated with the second user in the inactive state performing a plurality of actions;

receiving from the first client device a selection of a first animation overlay icon of the plurality of animation overlay icons, the first animation overlay icon comprising the first avatar and the second avatar performing a first action of the plurality of actions, the second user being in the inactive state; and responsive to receiving an indication that the second user is in an active state from the second client device, causing the communication interface to be displayed on the second client device, causing a first animation overlay corresponding to the first animation overlay icon to be displayed on the communication interface of the second client device, the first animation overlay being an animation that includes the first avatar and the second avatar performing the first action, the overlay being displayed as a layer above the communication interface.

* * * * *